June 2, 1964
W. H. GOETTL
3,135,317
HEAT PUMP AND MEANS FOR DEFROSTING THE
OUTSIDE COILS THEREOF
Filed March 10, 1960
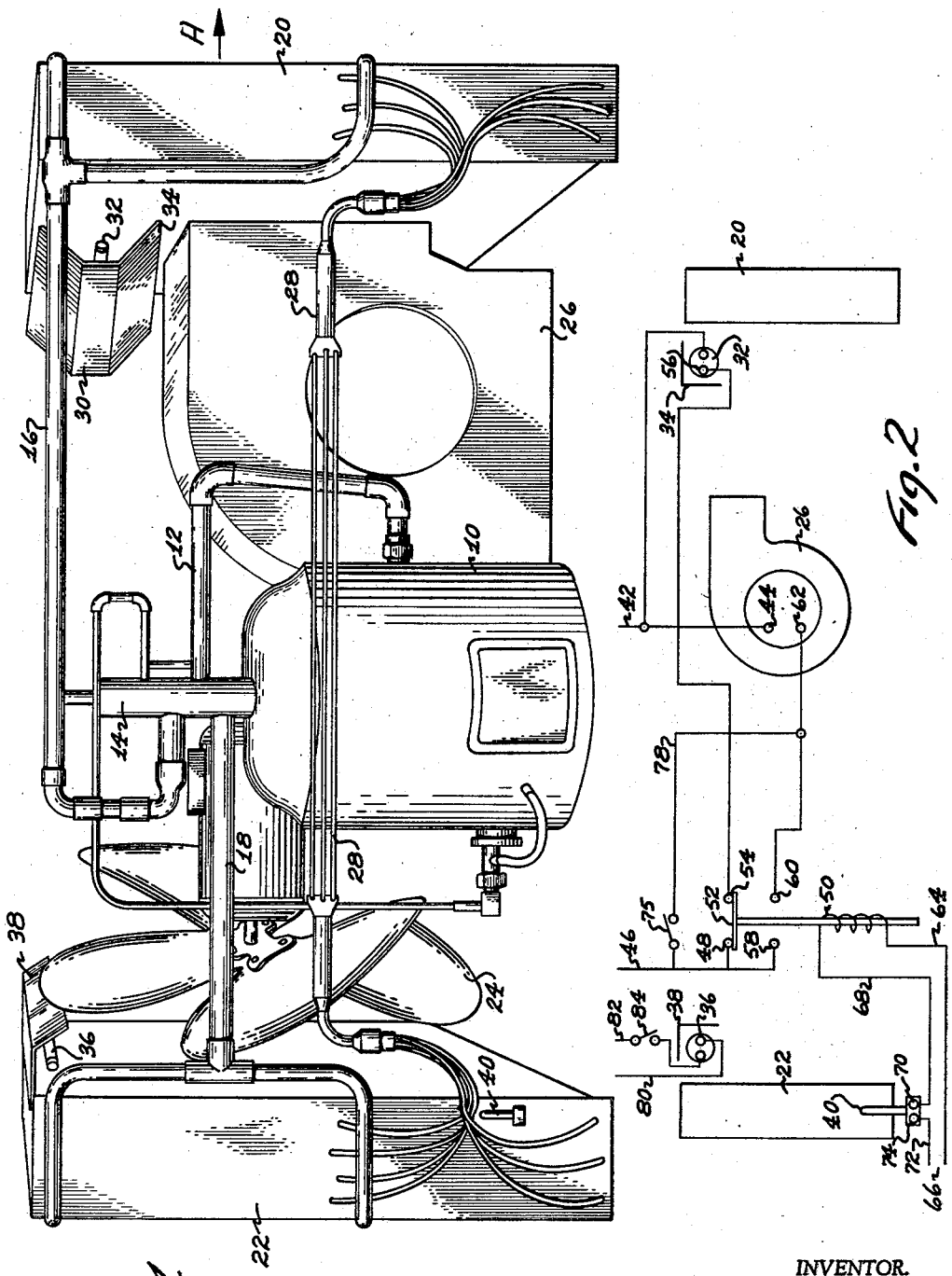
INVENTOR.
WILLIAM H. GOETTL
BY
Wm. H. Dean
AGENT

United States Patent Office 3,135,317
Patented June 2, 1964

3,135,317
HEAT PUMP AND MEANS FOR DEFROSTING THE OUTSIDE COILS THEREOF
William H. Goettl, 4627 N. Granite Reef Road, Scottsdale, Ariz.
Filed Mar. 10, 1960, Ser. No. 14,034
9 Claims. (Cl. 165—17)

This invention relates to a heat pump and means for defrosting the outside coils thereof.

Heat pumps, when operating under low ambient temperature conditions, often times become inoperative due to frost which collects on the outside coils thereof when subject to ambient atmosphere.

A usual method of defrosting the outside coil of a heat pump is the reversal of the unit operation so that it delivers heat to the outside coil and refrigerates the inside coil. This mode of operation creates an undesirable condition in the room being conditioned when heat is desired. During cold weather, it is highly undesirable to refrigerate the inside of a building room. However, this is what happens with conventional heat pumps while the outside coils thereof are being defrosted.

As a consequence, electrical elements are disposed downstream of the delivery duct of conventional heat pumps so that when they are reversed to defrost the outside coils thereof, the refrigerated air passing into the room is passed over the energized electrical heating elements to bring the temperature of the delivered air back up to a comfortable value.

The use of such a heat pump in addition to the supplemental electrical heating required during defrosting imposes high power requirements for the operation of the over-all system which sometimes requires a change in electrical wiring of a dwelling in order to supply sufficient power for the operation of a heat pump and its supplemental electrical heating equipment.

The foregoing method of supplemental heating requires heating elements of very high capacity since the heating operation of the heat pump is temporarily insufficient during an interim when the outside coil becomes frosted. Furthermore, such addition of heat to a room being conditioned by electrical heating elements becomes a very slow and inefficient operation with respect to the usual function of a heat pump. Under some conditions, heat pumps deliver more heat to the inside of a room than the equivalent electrical energy used to operate them. This condition of operation depends greatly on ambient temperatures of the outside atmosphere. However, such efficiency depends upon the temperature differential of the refrigerant and the relative volume and temperature of the gas in the outside coil with relation to ambient temperature.

Accordingly, it is an object of the invention to provide a heat pump and means for defrosting the outside coils thereof which not only defrosts such coils efficiently but also maintains efficient operation of the heat pump at ambient temperature conditions of the outside air which are lower than those temperatures at which a heat pump normally operates efficiently.

Another object of the invention is to provide a heat pump in which the inside coil is directly heated by radiation during which time the inside coil fan may be shut off allowing the compressor of the heat pump to transfer the heated refrigerant from the inside coil to the outside coil thereby defrosting it very rapidly.

Another object of the invention is to provide a heat pump wherein heat may be added to the system thereof in order to increase the operating temperature of the refrigerant in the system so that the operating capacity of the compressor is maintained at a high value during low temperature of the outside atmosphere whereby the heat pump operates efficiently to deliver a substantial amount of heat from the outside atmosphere in proportion to the equivalent electrical energy utilized to operate the heat pump.

Another object of the invention is to provide a heat pump wherein a radiant heating lamp is used to heat the inside coil of the heat pump whereby heat may be added to supplement the output of the heat pump and/or to raise the temperature of the refrigerant in the system to avoid frosting of the outside coil thereon.

Another object of the invention is to provide a heat pump wherein the coils thereof may be radiantly heated by a quartz rod lamp having very great heating capacity in proportion to its size.

Another object of the invention is to provide a heat pump wherein the inside coil thereof is radiantly heated in order to concentrate all of the heat energy in said coil so that the operating temperature of the fluid in the heat pump is raised to provide more efficient operation of the outside coil at low temperatures whereby a relatively great amount of heat may be extracted from the atmosphere in proportion to the energy applied by the lamp thus increasing the over-all efficiency of the heat pump.

Further objects and advantages of the invention may be apparent from the following specification, appended claims and accompanying drawings in which:

FIG. 1 is a diagrammatic view of a heat pump having radiantly heated coils according to the present invention and FIG. 2 is a diagrammatic view of the electrical wiring of the present invention.

As shown in FIG. 1 of the drawings, a conventional heat pump compressor 10 is provided with an inlet conduit 12 coupled to a conventional reversing valve 14 having gas conduits 16 and 18 communicating with inside and outside coils 20 and 22, respectively.

Adjacent the outside coil is a fan 24 which is disposed to force ambient air through the outside coil 22 while a blower 26 is disposed to force air through the inside coil 20 and into a room in the direction of the arrow A for conditioning the interior of the room.

Intercommunicating with the inside and outside coils 20 and 22 is a conventional fluid capillary manifold 28 disposed to maintain a fluid pressure differential between the coils 20 and 22.

Adjacent the inside coil 20 is a radiant heating lamp 30 which is provided with a quartz rod heat element 32 and reflector 34 disposed to reflect radiation toward the coil 20.

It will be understood by those skilled in the art that any equivalent lamp may be used however the quartz lamp has high capacity in proportion to its size.

Another quartz rod lamp 36 is disposed adjacent the outside coil 22 and is provided with a reflector 38 disposed to reflect radiant energy onto the outside coil 22.

Under certain ambient temperature conditions the outside coil 22 when subject to air flow induced by the fan 24 tends to accumulate frost which reduces the air flow capacity through the coil 22. When this happens it is desirable to defrost the coil and at this time the lamps 32 and 36 may be energized to add heat to the system in order to alleviate the frost condition on the coil 22.

Attention is directed to the lamp 32 which radiates heat energy to the inside coil 20. Due to the fact that this lamp directly applies energy to the coil 20 it is not necessary to use the blower 26 to convey heat to the coil 20. Thus, normal operation of the compressor 10 without operation of the blower 26 causes the refrigerant fluid to be transferred from the heated coil 20 to the frosted coil 22 which directly alleviates the frosted condition thereof.

Energy from the lamp 32 may be used to supplement operation of the heat pump system. Under such conditions of operation and when the ambient temperature is low, the elevated temperature of the gas leaving the inside coil 20 provided for greater volumetric operation of the system and permits the outside coil 22 to extract more heat from the ambient atmosphere than it would normally when the temperature of the refrigerant fluid is respective to the temperature of the atmosphere in a low temperature range. It has been found that radiant energy from the lamp 32 when used to heat the refrigerant fluid in the system actually improves the over-all efficiency of the system under some conditions due to the fact that the refrigerant operates at a higher temperature and hence the system is able to operate at a higher heat exchange capacity.

It will be understood that heating of the refrigerant reduces the temperature differential between the outside coil and the atmosphere but this is more than compensated for by a corresponding increase in the system capacity. The outside coil capacity and/or area is great relative to that of the inside coil so that it can absorb a substantial amount of heat from the atmosphere when at a low temperature differential thereto.

When the inside coil 20 is operating to deliver heat to a room or use location and when the ambient temperature is low or critical with respect to the functional ability of the heat pump; temperature of the fluid in the inside coil is low relative to inside room temperature whereby a relatively small volume of fluid boils away at a low rate to the inlet of the compressor. This tends to lower the volumetric efficiency of the compressor and consequently the amount of fluid it may deliver to the outside coil 22 in a given length of time.

It will be apparent to those skilled in the art that when operation of the radiant heating lamp 32 is initiated that the inside coil 20 is very rapidly heated whereupon the outside coil is quickly defrosted and the heat pump does not have a great lapse in its delivery of warm air into the space being conditioned as indicated by the arrow A in FIG. 1 of the drawings.

Under some conditions of operation, it is desired to utilize the radiant heating lamp 36 to apply heat to the outside coil 22 in order to defrost the same. The radiant heat applied by the lamp 36 may be additive to that applied by the lamp 32 and may function cooperatively or independently of the operation of the fan 24 during the defrosting operation.

A thermostat 40 is disposed adjacent the lower portion of the outside coil 22 and is electrically coupled to the radiant heating element 34 in order to energize it at a predetermined low temperature of the outside coil 22. This thermostat 40 also controls operation of the motor of the blower 26. When the lamp 32 is energized the motor operating the blower 26 is deenergized so that no air flows through the inside coil 20 during the defrosting operation hereinbefore described.

It may be desirable, however, to supplement the capacity of the heat pump by operating the lamp 32 concurrently with the operation of the blower 26 under some conditions.

Attention is directed to FIG. 2 of the drawings which is a diagrammatic view of the electrical equipment utilized to control the lamps 32 and 36 and the motor of the blower 26 in response to operation of the thermostat 40.

The lamp 32 adjacent the inside coil 20 is coupled to an electrical conductor 42 which is a source of high voltage electrical energy. This conductor 42 is also coupled to a terminal 44 of the blower 26. The remaining conductor 46 of the high voltage line is coupled to a terminal 48 of a relay 50 having a bridge contact 52 which is disposed to concurrently engage contact 54 coupled to a second terminal 56 of the lamp 32 so that the relay when in the position shown energizes the lamp 32. The line 46 is also coupled to a terminal 58 which is adjacent to another terminal 60 which is coupled to a second terminal 62 of the blower 26. The bridge 52 is adapted to bridge the contacts 58 and 60 to energize the motor of the blower 26 and when in this position leaves the contacts 48 and 54 open whereby the lamp 32 is deenergized.

The relay 50 is provided with one conductor 64 coupled to a low voltage supply 66 and another terminal 68 is coupled to the relay 50 and is coupled to a terminal 70 of the thermostat 40. A second conductor 72 is coupled to a terminal 74 of the thermostat to the low voltage supply 68.

In operation, it will be seen that the relay 50 when energized by the thermostat 40 will close the contacts 48 and 54 to energize the lamp 32 and in this position the contacts 58 and 60 may be disengaged to stop operation of the blower 26.

A switch 75 is disposed to couple the line 46 by means of a conductor 78 directly to the terminal 44 of the blower whereby the relay 50 is bypassed to permit alternate use of the blower motor when the lamp 32 is energized so that the lamp 32 may operate in conjunction with the blower 26 as a supplemental heat source for the heat pump.

The lamp 36 is coupled to a pair of conductors 80 and 82 controlled by a switch 84 which permits optional use of the lamp 36 as desired to heat the outside coil 22.

It will be obvious to those skilled in the art that various modifications of the present invention may be resorted to in a manner limited only by a just interpretation of the following claims.

I claim:

1. In a heat pump and means for alleviating frosting thereof the combination of: a heat pump having inside and outside coils; a compressor; a reversing valve coupled thereto and permitting a reversal of the flow of gas relative to said inside and outside coils; flow passage means connecting said coils, reversing valve and compressor; means for forcing air over each of said inside and outside coils; and a means for directly heating one of said coils, said last mentioned coil coupled to the inlet of said compressor and disposed to deliver vaporized fluid thereto.

2. In a heat pump and means for alleviating frosting thereof the combination of: a heat pump having inside and outside coils; a compressor; a reversing valve coupled thereto and permitting a reversal of the flow of gas relative to said inside and outside coils; flow passage means connecting said coils, reversing valve and compressor; means for forcing air over each of said inside and outside coils; and a radiant heating lamp adjacent one of said coils for radiantly heating the same to thereby heat refrigerant fluid therein, said last mentioned coil coupled to the inlet of said compressor and thus disposed to, cause the heated fluid when compressed and circulated by said compressor to defrost the outside coil.

3. In a heat pump and means for alleviating frosting thereof the combination of: a heat pump having inside and outside coils; a compressor; a reversing valve coupled thereto and permitting a reversal of the flow of gas relative to said inside and outside coils; flow passage means connecting said coils, reversing valve and compressor; means for forcing air over each of said inside and outside coils; and a radiant heating lamp adjacent one of said coils for radiantly heating the same to thereby heat refrigerant fluid therein, said last mentioned coil coupled to the inlet of said compressor and thus disposed to cause the heated fluid when compressed and circulated by said compressor to defrost the outside coil; and a thermostat disposed in position to be responsive to a predetermined low temperature condition of said outside coil and disposed to cause energization of said radiant heating lamp.

4. In a heat pump and means for alleviating frosting thereof the combination of: a heat pump having inside and outside coils; a compressor; a reversing valve coupled thereto and permitting a reversal of the flow of gas relative to said inside and outside coils; flow passage means connecting said coils, reversing valve and compressor; means for forcing air over each of said inside and outside coils; and a radiant heating lamp adjacent said inside coil whereby it heats and causes vaporization of refrigerant fluid therein, said inside coil communicating directly with the inlet of said compressor, said compressor disposed to pump fluid directly from said inside coil to said outside coil whereby fluid is pumped and compressed, by said compressor and forced through said outside coil for defrosting the same.

5. In a heat pump and means for alleviating frosting thereof the combination of: a heat pump having inside and outside coils; a compressor; a reversing valve coupled thereto and permitting a reversal of the flow of gas relative to said inside and outside coils; flow passage means connecting said coils, reversing valve and compressor; means for forcing air over each of said inside and outside coils; and a radiant heating lamp adjacent said inside coil whereby it heats and causes vaporization of refrigerant fluid therein, said inside coil communicating directly with the inlet of said compressor, said compressor disposed to pump fluid directly from said inside coil to said outside coil whereby fluid is pumped and compressed, by said compressor and forced through said outside coil for defrosting the same; a thermostat responsive to a predetermined low temperature condition of refrigerant in said heat pump means; means coupled to said thermostat for deenergizing said means for forcing air over said inside coil and concurrently energizing said radiant heating lamp whereby the inside coil is radiantly heated without any air flowing through said inside coil to permit all of the energy applied by said lamp to be carried from said inside coil by the refrigerant to said outside coil for defrosting the same.

6. In a heat pump and means for alleviating frosting thereof the combination of: a heat pump having inside and outside coils; a compressor; a reversing valve coupled thereto and permitting a reversal of the flow of gas relative to said inside and outside coils; flow passage means connecting said coils, reversing valve and compressor; first means for forcing air over each of said inside and outside coils; second means for adding heat directly to said heat pump upstream of said compressor when said compressor is delivering fluid from said inside coil to said outside coil for heating refrigerant fluid so that it may be circulated by said compressor to said outside coil for defrosting the same; a thermostat disposed adjacent said outside coil and responsive to temperature thereof and to deenergize said means for forcing air over said inside coil and concurrently energizing said second means whereby said inside coil is without any air flowing through the same to permit substantially all of the energy applied by said second means to be carried by said refrigerant to said outside coil for defrosting the same; said second means being a radiant heating lamp directed toward said inside coil and disposed to heat the same.

7. In a heat pump means for alleviating frosting thereof the combination of: a heat pump having inside and outside coils operating to collect heat at said outside coil and reject heat from said inside coil; a compressor; a reversing valve coupled thereto and permitting a reversal of the flow of gas relative to said inside and outside coils; flow passage means connecting said coils, reversing valve and compressor; first means for forcing air over said inside coil; second means for adding heat directly to said heat pump upstream of said compressor when said compressor is delivering heated and vaporized fluid from said inside coil to said outside coil for heating said refrigerant fluid so that an efficient volume thereof may be circulated by said compressor to said outside coil; a thermostat disposed adjacent said outside coil to sense a temperature condition of said outside coil and to control said second means.

8. In a heat pump the combination of: inside and outside coils; a compressor having an inlet and outlet, said inlet communicating with one of said coils and said outlet communicating with the other of said coils; flow passage means connecting said coils and said compressor; means for forcing air over said coils; first means for directly applying supplemental heat to one of said coils communicating with said inlet of said compressor to heat the refrigerant fluid therein; and second means for maintaining a fluid pressure differential between said coils when said first means applies heat to said coil with which the inlet of said compressor communicates.

9. In a heat pump and means for alleviating frosting thereof the combiation of: a heat pump having first and second coils; a compressor; a reversing valve coupled thereto and permitting a reversal of the flow of gas relative to said first and second coils; flow passage means connecting said coils and said compressor; first means for forcing air over each of said first and second coils; second means for adding heat directly to one of said coils, said last mentioned coil communicating directly with the inlet of said compressor when said compressor is delivering fluid from said last mentioned coil to the other of said coils for heating refrigerant fluid so that it may be compressed and circulated by said compressor to said other coil for defrosting the same; a thermostat adjacent one of said coils and coupled to said first and second means disposed to de-energize said first means and concurrently energizing said second means whereby said heated coil is without any air flowing through the same to permit substantially all of the energy applied by said second means to vaporize refrigerant fluid and to be carried by said refrigerant fluid to the one of said coils being defrosted.

References Cited in the file of this patent
UNITED STATES PATENTS

| | | |
|---|---|---|
| 2,672,734 | Ditzler et al. | Mar. 23, 1954 |
| 2,847,190 | Slattery et al. | Aug. 12, 1958 |
| 2,934,323 | Burke | Apr. 26, 1960 |
| 2,969,959 | Kuhn et al. | Jan. 31, 1961 |
| 2,970,816 | McCarty | Feb. 7, 1961 |